United States Patent
Khawand

(10) Patent No.: US 9,596,398 B2
(45) Date of Patent: Mar. 14, 2017

(54) AUTOMATIC IMAGE CAPTURE

(75) Inventor: Charbel Khawand, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 46 days.

(21) Appl. No.: 13/224,704

(22) Filed: Sep. 2, 2011

(65) Prior Publication Data

US 2013/0057713 A1 Mar. 7, 2013

(51) Int. Cl.
*H04N 5/228* (2006.01)
*H04N 5/232* (2006.01)

(52) U.S. Cl.
CPC ......... *H04N 5/232* (2013.01); *H04N 5/23216* (2013.01); *H04N 5/23229* (2013.01); *H04N 5/23248* (2013.01); *H04N 5/23258* (2013.01)

(58) Field of Classification Search
CPC .... H04N 5/23251; H04N 5/144; H04N 5/145; H04N 5/23254; H04N 5/232; H04N 5/23216; H04N 5/23229; H04N 5/23248; H04N 5/23258
USPC ................................. 348/208.1, 61
See application file for complete search history.

(56) References Cited

U.S. PATENT DOCUMENTS

| 4,965,619 A | 10/1990 | Shikaumi et al. | |
|---|---|---|---|
| 7,773,115 B2 | 8/2010 | Estevez et al. | |
| 7,924,323 B2* | 4/2011 | Walker | G11B 27/034 348/231.2 |
| 8,094,208 B2* | 1/2012 | Myhrvold | H04N 5/2254 348/222.1 |
| 8,428,308 B2* | 4/2013 | Jasinski | H04N 5/2351 348/211.13 |
| 8,587,670 B2* | 11/2013 | Wood | H04N 1/00323 348/207.99 |

(Continued)

FOREIGN PATENT DOCUMENTS

| CN | 101682694 | 3/2010 |
|---|---|---|
| JP | 2006-005877 | 1/2006 |
| KR | 10-2007-0069302 | 7/2007 |

OTHER PUBLICATIONS

Park et al., "Jitter suppression in model-based camera tracking", IEEE, pp. 204-211, http://ieeexplore.ieee.org/stamp/stamp.jsp?tp=&arnumber=5665984, (Oct. 20-23, 2010).

(Continued)

*Primary Examiner* — Ngoc-Yen Vu
(74) *Attorney, Agent, or Firm* — Klarquist Sparkman, LLP

(57) ABSTRACT

Disclosed herein are exemplary embodiments for automatically capturing images in a mobile electronic device. One embodiment comprises sensing device motion and automatically triggering image capture when the device is stationary. Use of this approach reduces image blur and avoids the need for subsequent image alteration or compensation for camera motion. Images can simply be captured in-between motions by leveraging high-resolution sensors and computational assets available to the mobile device to accurately assess when to trigger the shutter. Images can then be saved in a memory within the device. Enhancements to the disclosed method of automatic image capture include pre-selecting a set of threshold values for image acceptance.

21 Claims, 10 Drawing Sheets

(56) References Cited

U.S. PATENT DOCUMENTS

| | | | |
|---|---|---|---|
| 8,730,359 B2* | 5/2014 | Sharman | H04N 5/345 348/272 |
| 2002/0060737 A1* | 5/2002 | Hsieh et al. | 348/208 |
| 2005/0157198 A1* | 7/2005 | Larner et al. | 348/345 |
| 2006/0012699 A1* | 1/2006 | Miki | 348/333.01 |
| 2007/0127902 A1 | 6/2007 | Ziemkowski | |
| 2008/0007620 A1 | 1/2008 | Wang et al. | |
| 2008/0129825 A1 | 6/2008 | DeAngelis et al. | |
| 2008/0152332 A1 | 6/2008 | Koo et al. | |
| 2008/0166117 A1 | 7/2008 | Li et al. | |
| 2008/0218782 A1* | 9/2008 | Seki et al. | 358/1.9 |
| 2008/0294012 A1* | 11/2008 | Kurtz et al. | 600/300 |
| 2008/0298796 A1* | 12/2008 | Kuberka et al. | 396/263 |
| 2009/0027337 A1* | 1/2009 | Hildreth | 345/158 |
| 2009/0079844 A1 | 3/2009 | Suzuki | |
| 2009/0322865 A1 | 12/2009 | Wang et al. | |
| 2010/0220899 A1* | 9/2010 | Steinberg et al. | 382/118 |
| 2010/0309335 A1* | 12/2010 | Brunner et al. | 348/231.6 |
| 2011/0069180 A1* | 3/2011 | Nijemcevic et al. | 348/207.1 |
| 2011/0199470 A1* | 8/2011 | Moller et al. | 348/61 |
| 2011/0317031 A1* | 12/2011 | Honda | H04N 5/23219 348/229.1 |

OTHER PUBLICATIONS

International Search Report dated Jan. 7, 2013, from International Patent Application No. PCT/US2012/053256, 3 pp.
Written Opinion dated Jan. 7, 2013, from International Patent Application No. PCT/US2012/053256, 4 pp.
Notice on the First Office Action dated Jul. 31, 2014, from Chinese Patent Application No. 201210320291.3, 12 pp.
Notice on the Second Office Action dated Dec. 22, 2014, from Chinese Patent Application No. 201210320291.3, 9 pp.
Notice on the Third Office Action dated Jul. 6, 2015, from Chinese Patent Application No. 201210320291.3, 9 pp.
Decision on Rejection dated Jan. 26, 2016, from Chinese Patent Application No. 201210320291.3, 9 pp.

* cited by examiner

AUTOMATIC IMAGE CAPTURE

FIELD

This disclosure pertains to methods, systems, and apparatus for automatically performing image capture in a mobile electronic device.

BACKGROUND

Today's mobile electronic devices often include hardware and associated software that allow the device to capture and store images. For instance, mobile phones that include image capture functionality are commonly referred to as camera phones and allow a user to easily and quickly capture snapshots or live video. Because camera phones are handheld, however, motion of the user's arm or hand transfers directly to the camera, and inevitably, image quality is degraded. In addition to hand jitter, image capture in camera phones is typically activated through a touchscreen button, which creates additional camera motion. Moreover, differences in the design and construction of camera components that are used with mobile electronic devices make them more susceptible to user-induced motion than conventional, stand-alone, cameras. For instance, the camera components used in a mobile electronic device are typically designed for compactness, convenience, and price, resulting in components that are not capable of operating with the quality and precision of their counterparts in stand-alone cameras.

SUMMARY

Techniques and tools for capturing still or video images using a camera in a mobile electronic device are described herein. One of the exemplary techniques disclosed herein comprises sensing camera motion and automatically triggering image capture when the camera is stationary. Use of this approach avoids taking a picture while the camera is in motion, thus reducing image blur. Use of this exemplary method also reduces or eliminates the need for subsequent image alteration or motion compensation. In particular embodiments, images are captured in-between motions by leveraging high-resolution sensors and computational assets available to the mobile device that accurately assess when to trigger the shutter. Images can then be saved in memory within the device. In certain embodiments of the disclosed automatic image capture techniques, a set of trigger criteria and threshold values for image acceptance are pre-selected (e.g., by a user). The disclosed techniques can be implemented in a wide variety of systems and apparatus. For example, one exemplary system comprises a mobile device comprising a camera, a device motion detector, and a processor (e.g., an image signal processor (ISP)) programmed to receive data from the motion detector and to trigger image capture.

This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

Figure 1:
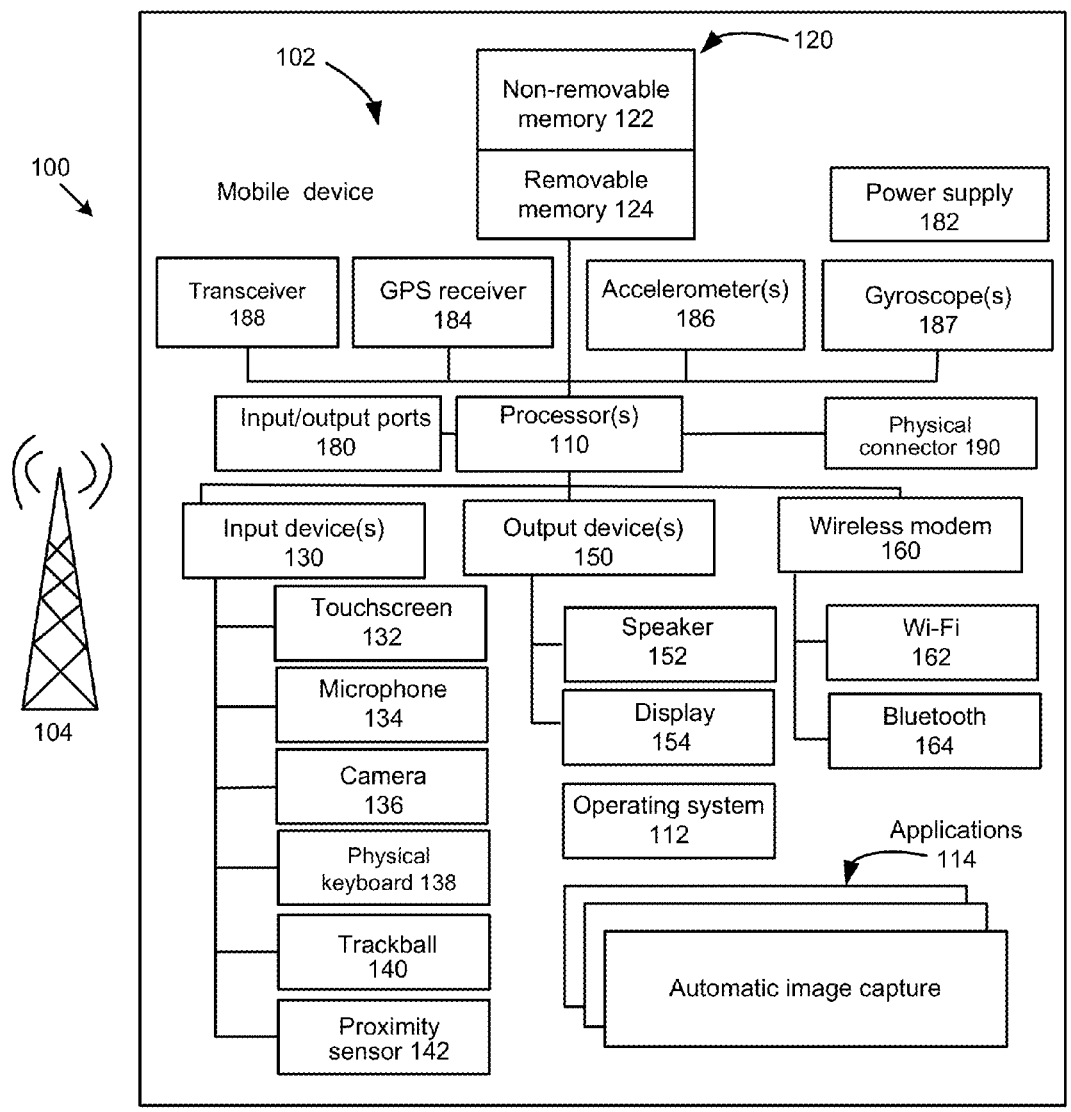
FIG. 1 is a system diagram depicting an exemplary mobile device, including a variety of optional hardware and software components.

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Additionally, the term "and/or" means any one item or combination of items in the phrase.

The described methods, systems, and apparatus described herein should not be construed as limiting in any way. Instead, this disclosure is directed toward all novel and non-obvious features and aspects of the various disclosed embodiments, alone and in various combinations and sub-combinations with one another. The disclosed methods, systems, and apparatus are not limited to any specific aspect or feature or combinations thereof, nor do the disclosed methods, systems, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed methods, systems, and apparatus can be used in conjunction with other methods, systems, and apparatus. Additionally, the description sometimes uses terms like "produce," "generate," "select," "capture," and "provide" to describe the disclosed methods. These terms are high-level abstractions of the actual operations that are performed. The actual operations that correspond to these terms may vary depending on the particular implementation and are readily discernible by one of ordinary skill in the art.

Any of the disclosed methods can be implemented using computer-executable instructions stored on one or more computer-readable storage media (e.g., non-transitory computer-readable media, such as one or more volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application).

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, HTML5, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

FIG. 1 is a system diagram depicting an exemplary mobile device 100 including a variety of optional hardware and software components, shown generally at 102. Any component 102 in the mobile device can communicate with any other component, although not all connections are shown, for ease of illustration. The mobile device 100 can be any of a variety of computing devices (e.g., cell phone, smartphone, tablet computer, netbook, handheld computer, Personal Digital Assistant (PDA), or other such device) and can allow wireless two-way communications with one or more mobile communications networks 104, such as a cellular or satellite network.

The illustrated mobile device 100 can include one or more controllers or processors 110 (e.g., a signal processor, microprocessor, ASIC, or other control and processing logic circuitry) for performing such tasks as signal coding, data processing, input/output processing, power control, and/or other functions. In some embodiments, the mobile device 100 includes a general processor and an image signal processor (ISP). The ISP can be coupled to the camera 136 and can include circuit components for performing operations specifically designed for image processing and/or rendering. An operating system 112 can control the allocation and usage of the components 102, including power states, and provide support for one or more application programs 114. The application programs can include common mobile computing applications (e.g., email applications, calendars, contact managers, web browsers, messaging applications), an automatic image capture application according to the disclosed technology, or any other computing application.

The illustrated mobile device 100 includes memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory, a Subscriber Identity Module (SIM) card, or other well-known memory storage technologies, such as "smart cards." The memory 120 can be used for storing data and/or code for running the operating system 112 and the application programs 114. Example data can include web pages, text, images, sound files, video data, or other data sets to be sent to and/or received from one or more network servers or other devices via one or more wired or wireless networks.

The mobile device 100 can support one or more input devices 130, such as a touchscreen 132, microphone 134, camera 136, physical keyboard 138, trackball 140, and/or proximity sensor 142, and one or more output devices 150, such as a speaker 152 and one or more displays 154. Other possible output devices (not shown) can include piezoelectric or haptic output devices. Some devices can serve more than one input/output function. For example, touchscreen 132 and display 154 can be combined into a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, one or more accelerometers 186, one or more gyroscopes 187, and/or a physical connector 190, which can be a USB port, IEEE 1394 (FireWire) port, and/or RS-232 port. The accelerometer(s) 186 and/or the gyroscope(s) 187 can be implemented as micro-electro-mechanical systems (MEMS), which can be coupled to or embedded in an integrated circuit chip. The illustrated components 102 are not required or all-inclusive, as any components can be deleted and/or other components can be added.

Figure 2:
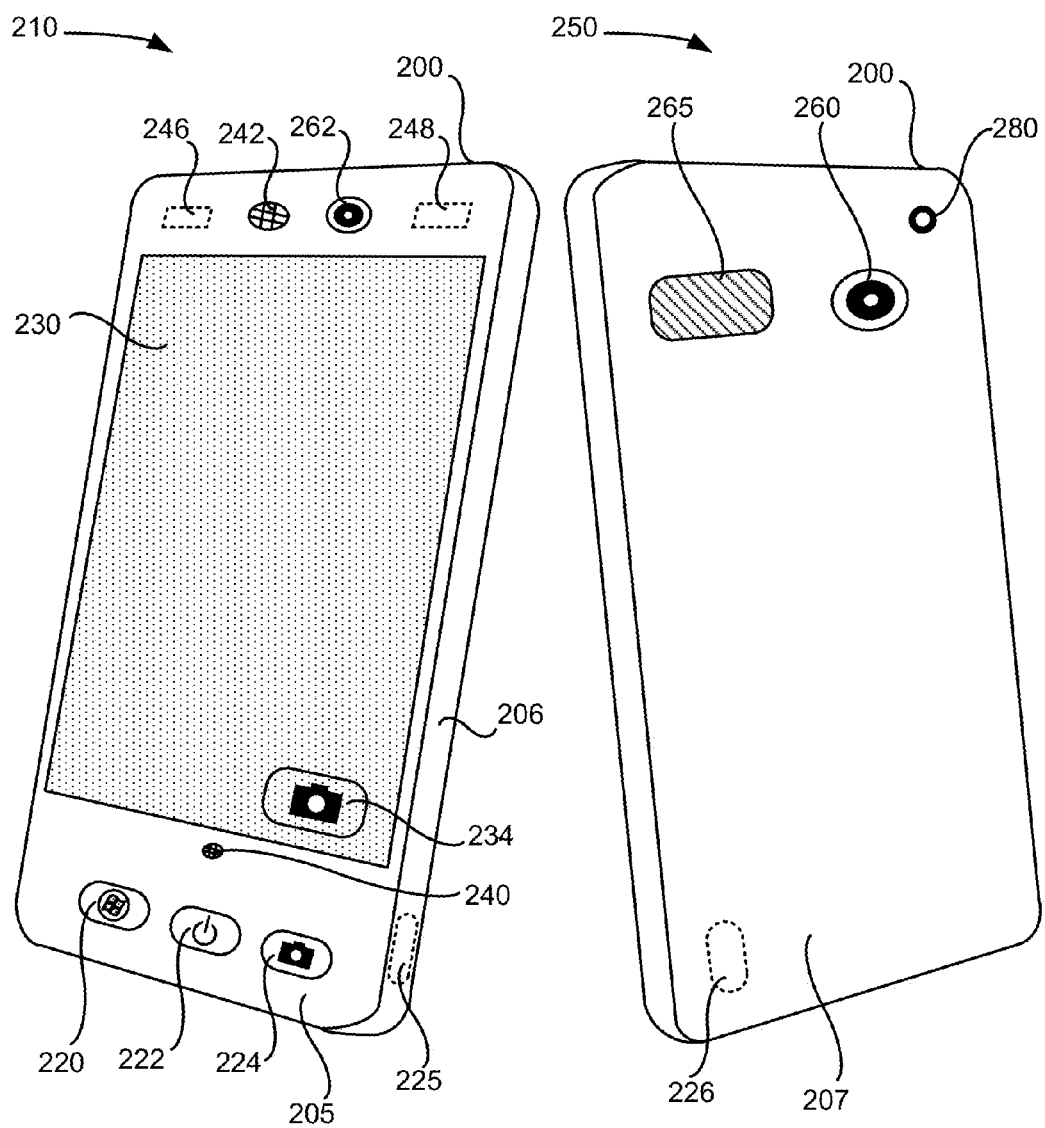
FIG. 2 illustrates a generalized example of a mobile device, including a touchscreen display, a camera, proximity sensors, and buttons.

FIG. 2 depicts the front and back of an example mobile device 200. In particular, the left side of FIG. 2 depicts a front view 210 of the example mobile device 200, while the right side of FIG. 2 depicts a rear view 250 of the mobile device. As shown, the mobile device 200 includes several hardware buttons, including a home button 220, a power button 222, and a camera shutter (image-capture) button 224. Also depicted is a touchscreen display 230, which is shown displaying a touchscreen camera shutter button 234. In certain implementations, the touchscreen camera shutter button 234 replaces and is used instead of the camera shutter button 234. In other embodiments, the touchscreen camera shutter button 234 supplements the camera shutter button 234 as an alternative shutter button or is absent entirely.

Also shown in FIG. 2 is a frontward-facing lens 262. The lens 262 is positioned on the front face of the mobile device 200 and can therefore be used to capture an image of the user. In certain embodiments, an image capturing application being executed on the mobile device 200 allows a user to select whether the frontward-facing lens 262 is activated, a rearward-facing lens (such as lens 260), or both.

The mobile device 200 includes a microphone 240 and speaker 242, along with two proximity sensors 246 and 248, situated below the surface of the mobile device. In some examples, the proximity sensors 246 and 248 emit an infrared beam and receive a reflected infrared beam, which is reflected off the surface of a nearby object that has been illuminated by the emitted infrared beam. An intensity measurement, or other measured property for the received beam, can be used to determine whether an object is in proximity with the mobile device 200.

The camera shutter button 224 of the mobile device 200 is a dedicated dual-action camera shutter button, with the ability to detect "half-press" and "full-press" as distinct, separate actions. As is readily understood to those of skill in the art, a half-press refers to the partial actuation of a button or other control, while a full-press refers to a further actuation of the button or control past a determined limit. In some examples, the dual-action camera shutter button 224 is associated with the following attributes. When a half-press is detected, input data is received with the mobile device that is associated with auto-focus functionality. When a full-press is detected, input data is received that is associated with camera invocation and image capture.

While the camera shutter button 224 is shown located on a front surface 205 of the mobile device 200, in other examples, a camera shutter button can be positioned at alternate locations. For example, the camera shutter button 224 can be located at location 225 (on a side surface 206) or location 226 (on a rear surface 207), respectively, of the mobile device.

Turning to the rear view 250 shown on the right in FIG. 2, the example mobile device 200 includes the camera lens 260 and an electronic flash 265. In some examples, there is no flash present in the mobile device 200. The individual components (e.g., the hardware buttons 220, 222, and 224, microphone 240, speaker 242, touchscreen display 230, camera lens 260 and flash 265) can be coupled to a mobile device chassis (not shown), which is connected to internal components of the mobile device 200, for example: one or more processors, a piezoelectric actuator, a power supply, and a modem.

As shown in FIG. 2, there are several considerations that can be made in the placement of components on the mobile device 200, such as the home button 220, power button 222, camera shutter button 224, the camera lens 260, electronic flash 265, proximity sensors 246 and 248, and the photodiode 280. For example, it is desirable that the placement of the camera shutter button 224 enables or even encourages a user to naturally position the mobile device 200 in a landscape position when capturing images. It is also desirable that the camera shutter button 224 be positioned such that operation of the button is facilitated using an index finger or thumb. For example, the camera shutter button 224 as shown can be easily accessed with a user's right thumb while capturing an image with the mobile device 200 in a landscape position. In other examples, the camera shutter button 224 can be moved to other suitable positions, for example, locations 225 or 226. It is also desirable that the camera shutter button 224 and/or power button 222 be positioned to avoid accidental actuation, in order to mitigate the chance that an image capture application will be launched inadvertently.

Figure 3:
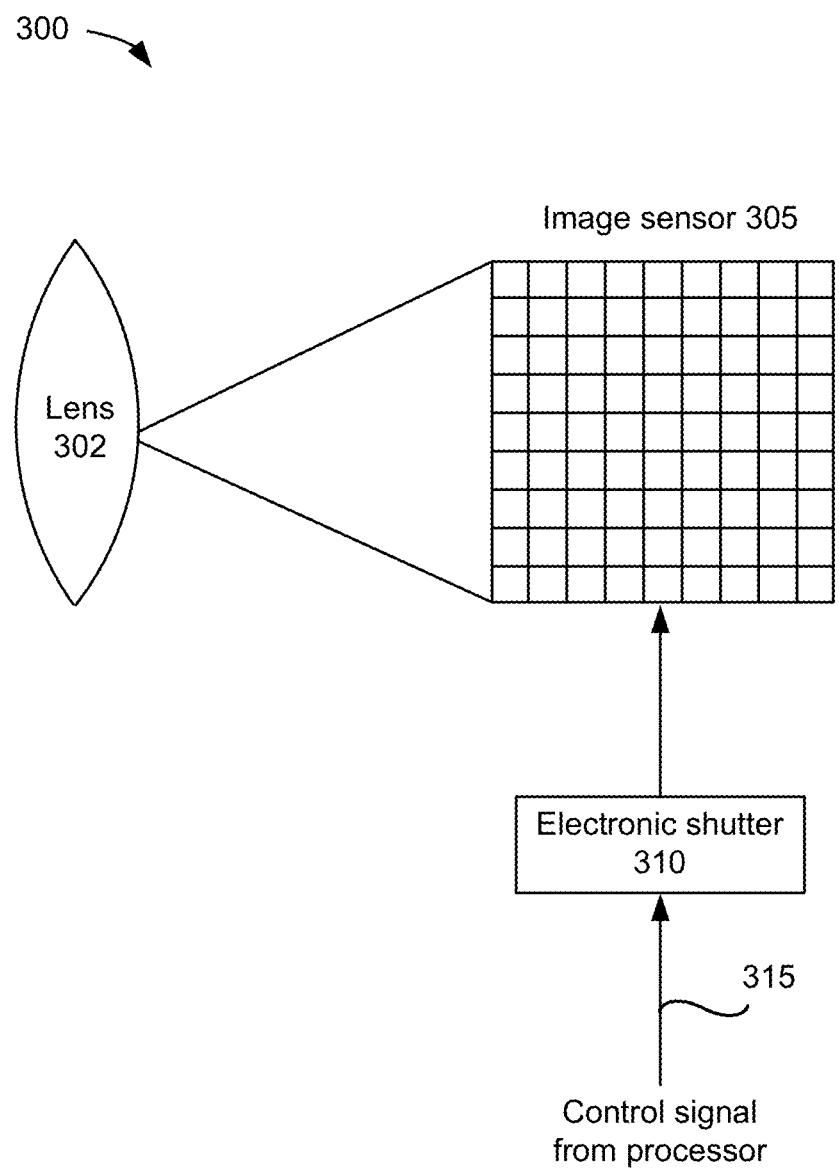
FIG. 3 is a block diagram illustrating basic components of a camera typically provided within mobile devices such as those shown in FIGS. 1 and 2.

FIG. 3 is a schematic block diagram showing components of an exemplary digital electronic camera 300 configured for use in a camera phone or other similar mobile electronic device. The exemplary digital electronic camera comprises lens 302 (which can correspond to the rearward-facing lens 260 or the frontward-facing lens 262 shown in FIG. 2), an image sensor array 305, and an electronic shutter 310, which can be controlled by a signal 315 generated by a processor (e.g., an image signal processor (ISP)). The lens 302 directs light reflected from a subject onto the image sensor array 305. Image sensors comprising array 305 can be charge-coupled devices (CCDs), complimentary metal-oxide-semiconductor (CMOS) devices, or other similar light-sensitive electronic components. Instead of using a mechanical shutter to block light from reaching the light sensor, the electronic shutter 310 controls the amount of time that the image sensor array 300 collects light.

Use of the electronic shutter 305 is one aspect in which a digital electronic camera in a mobile device typically differs from a conventional, stand-alone, digital camera. Electronic shutters tend to have a long "shutter-lag time" between when the user activates image capture and when the image is actually captured. Like a slow shutter speed, a long lag time can cause reduced image quality due to blur from vibration of the camera during image capture. Another difference between a digital electronic camera in a mobile device and stand-alone digital cameras is that the lens aperture is typically smaller in a camera used with a mobile device. As a result, less light enters the lens, necessitating the use of a slower shutter speed to compensate for the small aperture size.

In the case of a conventional, SLR (single lens reflex) or point-and-shoot digital camera, a tripod can be used in low light conditions to stabilize the camera body and prevent vibrations from degrading the sharpness of the image. However, use of a tripod requires preparation, which is inconvenient, and therefore tripods are generally not a feasible solution for camera phone photography. Consequently, camera phones are typically not equipped with a tripod screw, or other mounting hardware, thus precluding attachment of a tripod or other stabilizing structure to overcome image quality disadvantages inherent in the construction of cameras that are integrated with mobile devices.

Figure 4:
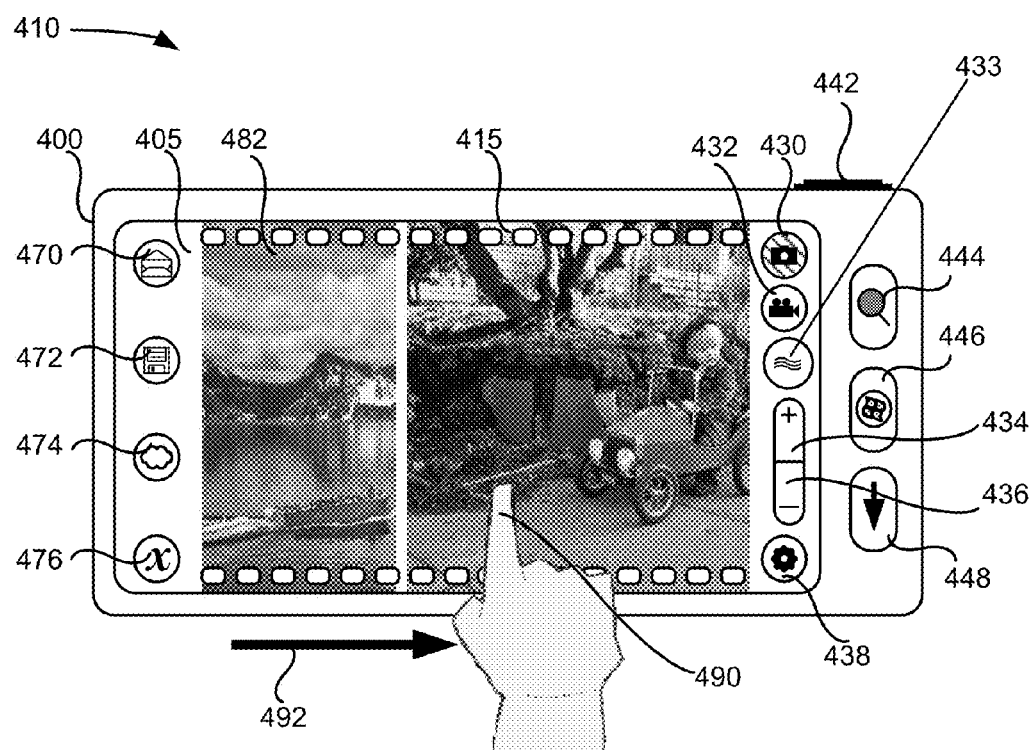
FIG. 4 illustrates a generalized example of the appearance of the device display while an image capture application is running on the mobile device.

FIG. 4 depicts a front view 410 of an example mobile device 400 displaying an image-capture application on a touchscreen display 405. The mobile device 400 is shown after capturing an image using the camera 300 shown in FIG. 3. As shown, the display 405 of the mobile device 400 includes controls 430, 432, 433, 434, 436, and 438, which can be used to control a subset of the image-capture functionality. These controls include a still image capture mode button 430 (highlighted to indicate that still capture is the currently selected capture mode), a video capture mode control 432, an automatic image capture mode button 433, zoom-in and zoom-out controls 434 and 436, and an options control 438. The automatic image capture mode button 433 can be implemented as a toggle switch to enter and exit the auto-capture mode so that once the auto-capture mode is on, pressing the mode button 433 constitutes an override of the auto-capture function. Auto-capture mode can be deactivated through other mechanisms as well, such as activation of the camera shutter button 442. Automatic image capture mode can be used in either still image capture mode or video capture mode.

The mobile device 400 also includes several hardware buttons, including a camera "shutter button" 442 located on a side surface of the mobile device, as well as a search button 444, a home button 446, and a back button 448, which are located on a front surface of the mobile device. These hardware buttons 442, 444, 446, and 448 can be used for invoking and/or executing various operations using the mobile device 400. The camera shutter button 442 can be used for invoking and/or executing an image capture application, as well as controlling functions within the image capture application, such as autofocusing and/or operating a camera shutter.

Controls for additional functions available in certain modes include email image button 470, save image button 472, upload image button 474, and delete image button 476. The mobile device is shown displaying an example "camera roll" application, which allows a user to see previously-captured images (e.g., image 482) by sliding a finger 490 in the direction shown by the arrow 492, which moves images 415 and 482 in the direction of finger motion across the display 405. Although the controls are shown as being displayed on a touchscreen, some or all of the controls can be implemented using hardware buttons.

Figure 5:
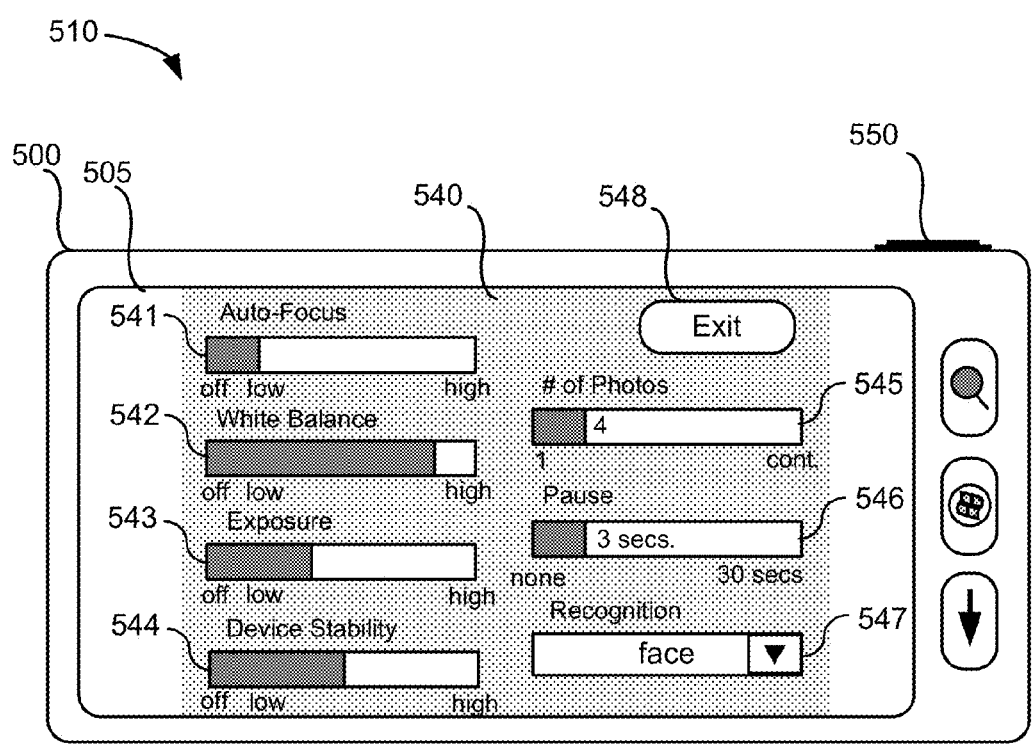
FIG. 5 illustrates a generalized example of a mobile device while presenting image-capture settings and options to be specified by a user.

FIG. 5 is a schematic block diagram illustrating a front view 510 of a mobile device 500 displaying an auto-capture mode settings screen 540. In general, the auto-capture mode settings screen 540 can be used to adjust and set the various parameters and criteria used by the mobile device when it is operating in auto-capture mode. For example, the auto-capture mode settings screen 540 lists one or more criteria that are used to determine when an image is to be captured and stored while the mobile device is operating in the auto-capture mode. A variety of criteria can be used, an example subset of which are shown in FIG. 5. The criteria can include one or more of an auto-focus value, a white balance value, an exposure value, a device stability value, a sharpness value, a gain value, a de-noising value, a contrast value, a flash value, or other such image quality and processing parameters. The auto-capture mode settings screen 540 can be accessed as part of the general settings for the mobile device, displayed when the auto-mode is first activated, or displayed after a screen appears when the auto-mode is activated asking the user whether the settings are to be changed. The auto-capture mode settings screen 540 includes one or more graphical user interface slider inputs that allow a user to set threshold values for the various criteria and parameters. In certain embodiments, when the threshold values are met for a current image sensed by the image sensor and without further input from the user, the image is captured and stored. Although slider inputs are shown, any other suitable user interface input mechanism can be used (e.g., virtual knobs, pull-down menus, user-input windows, or any other user input control).

In the illustrated embodiment, the auto-capture mode settings screen 540 comprises a slider 541 for adjusting an auto-focus value, a slider 542 for adjusting the white balance value for the camera, and a slider 543 for adjusting an exposure value. In the example shown, sliders 541, 542, 543, are shown as being generalized settings that are either "off"

or between "low," and "high". In other embodiments, the sliders 541, 542, 543, can show the actual values set by each slider.

The auto-capture mode settings screen 540 also comprises a slider 544 for adjusting a device stability value (also referred to as a "blur check value"). The device stability value can be computed using data received from one or more accelerometers and/or one or more gyroscopes associated with the mobile device (e.g., accelerometer(s) 186 and/or gyroscope(s) 187). For instance, the mobile device can be considered stationary if the changes (or differences) in one or more measurements (e.g., angular displacement measurements) sensed by the accelerometer, the gyroscope, or both the accelerometer and the gyroscope are within a certain threshold value for a specified period of time. The magnitude of this threshold value (which can be conceptually viewed as corresponding to the sensitivity for determining whether the device is stationary) can be used as the device stability value or it can be a factor in the device stability value. In other embodiments, the threshold value is set to a specific value, but the period of time in which the changes in measurements sensed by the accelerometer and/or gyroscope must satisfy the threshold value is variable. In such embodiments, the variable period of time is used as the device stability value or as a factor in the device stability value. In still other embodiments, both the threshold value and the time period are adjusted with changes to the device stability value. Other techniques for determining device stability and for adjusting the sensitivity of such a determination can also be used with embodiments of the disclosed technology. In the example shown, slider 544 is shown as being adjustable between "low" (indicating lower sensitivity, and thus allowing more movement to be tolerated while determining whether the device is stationary) and "high" (indicating higher sensitivity, and thus allowing for less movement to be tolerated while determining whether the device is stationary). In other embodiments, the slider 544 can show the actual values set by the slider.

The auto-capture mode settings screen 540 also comprises a slider 545 for adjusting the number of photos taken while the device is in auto-capture mode. For instance, when the mobile device is operating in auto-capture mode, the device can automatically capture images continuously until the auto-capture mode is deactivated or can capture a predetermined number of images. The slider 545 allows a user to select the number of photos or to set the device so that it captures images continuously. As shown, the current value of the slider is also displayed to the user. The auto-capture mode settings screen 540 further comprises a slider 546 for setting the length of a pause between auto-capture mode activation and image capture and storing. For example, when the mobile device is first set into auto-capture mode, image capturing and storage may be momentarily suspended so that the user can orient the camera into the direction of the intended subject. The slider 546 allows a user to deactivate the pause or to select a desired length of the pause (e.g., from 1 to 30 seconds). The auto-capture mode settings screen 540 further comprises a pull-down menu 547 for selecting a subject recognition criterion. For example, the auto-capture mode can operate in conjunction with facial recognition or object recognition software such that images are captured and stored only when the image is of a particular type or category of subject. For instance, an implementation of a Viola-Jones object detection technique can be used to detect when the image being sensed by the image sensor includes a face or other object for which the detector is trained. The pull-down menu 547 allows a user to deactivate object recognition as a criteria (e.g., by a selecting "none" as an option) or to select from among one or more possible objects (e.g., a face, multiple faces, and the like).

The values represented by the sliders 541, 542, 543, 544, 545, 546 and the pull-down menu 547 can be adjusted using input data received from the touchscreen display 505. In other examples, input data is received from hardware buttons or other input data sources can be used. The example criteria and parameters shown in FIG. 5 should not be construed as limiting, as fewer criteria can be used or additional criteria added. In general, any combination or sub-combination of image capture criteria can be used as thresholds for triggering automatic image capture and can be adjustable through an auto-capture mode settings screen (such as the auto-capture mode settings screen 540). Further, once the desired image capture criteria are set, the user can exit the auto-capture mode settings screen 540 by pressing an exit button (e.g., exit button 548).

Figure 6:
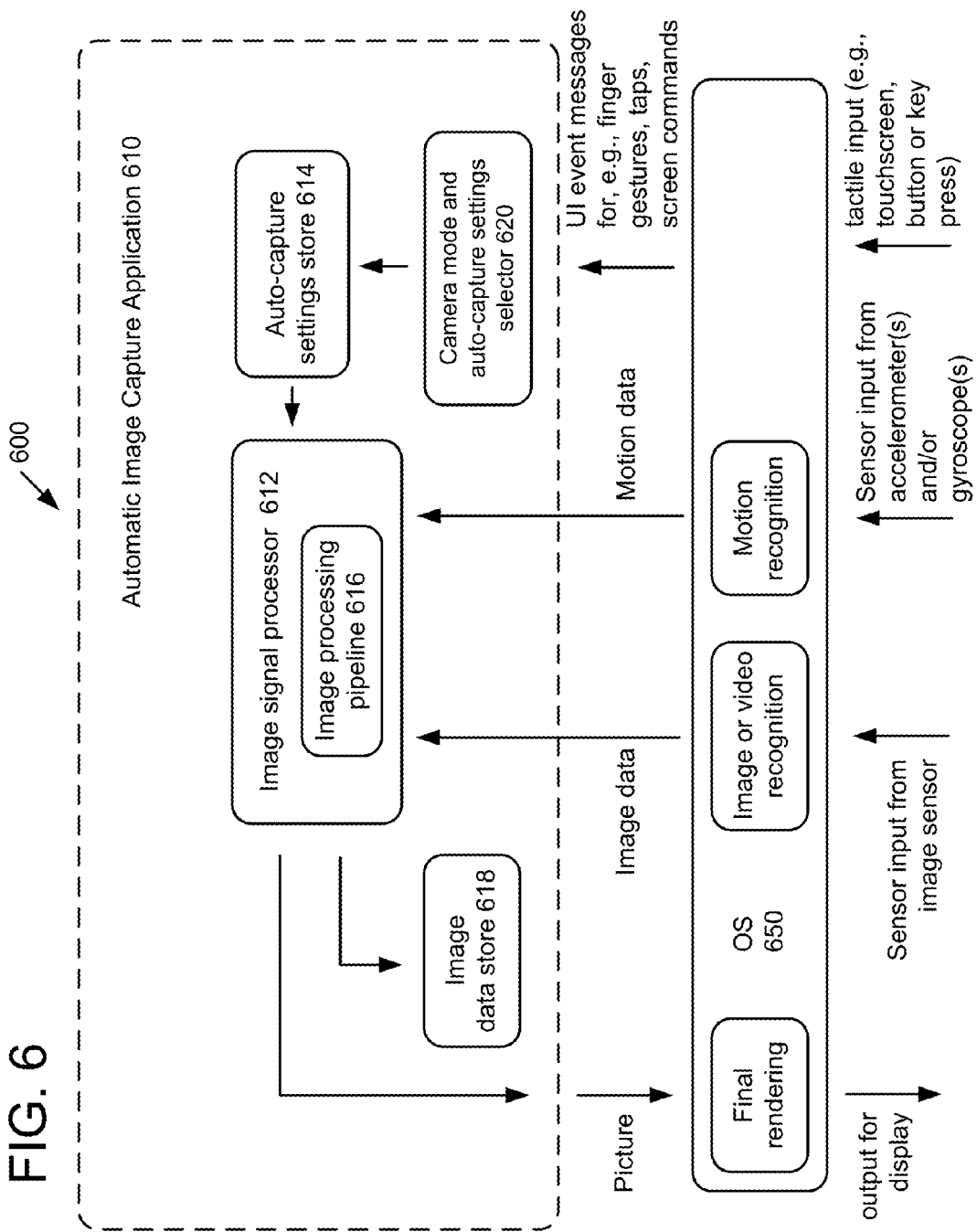
FIG. 6 is a block diagram of an exemplary software architecture for a mobile device that features automatic image capture.

FIG. 6 is a block diagram illustrating an exemplary software architecture 600 for an image capture application 610 that is configured to automatically capture images, without further user interaction, when the mobile device is stationary and when a set of user criteria are satisfied. A computing device (e.g., a smart phone or other mobile computing device) can execute software organized according to the architecture 600 to interface with motion-sensing hardware, interpret sensed motions, enter an automatic image capture mode, and time image capture so as to avoid image artifacts that can otherwise result from motion of the mobile device. The architecture 600 comprises a device operating system (OS) 650, and an exemplary image capture application 610 that is programmed to receive input from one or more device motion sensors (e.g., one or more accelerometers, one or more gyroscopes, and/or one or more other motion-sensing devices).

In FIG. 6, the image capture application 610 includes components such as an image signal processor component 612, an auto-capture settings store 614, an image data store 618, and a camera mode and auto-capture settings selector component 620. In the illustrated embodiment, the image signal processor component 612 implements an image processing pipeline 616 that is used with the automatic image capture application 610 to capture images when one or more criteria are satisfied, and thereby transform image data into an image format (e.g., JPEG, TIFF, or a similar format) for retention in the image data store 618 and/or for rendering to the display. The image signal processor component 612 and the image processing pipeline 616 can comprise software that is executed by a general processor in a mobile device, by a specialized processor adapted for image processing (e.g., an ISP), or by a combination of both. In certain embodiments, the camera mode and auto-capture settings and criteria selector component 620 comprises software that allows a user to select the auto-capture mode and to adjust the one or more criteria that are used to determine when an image is to be automatically captured. For example, the camera mode and auto-capture settings and criteria selector component 620 can implement the auto-capture mode settings screen 540 illustrated in FIG. 5. In the illustrated embodiments, the auto-capture settings store 614 is used to store the auto-capture mode settings and criteria set using the screen 540.

Figure 9:
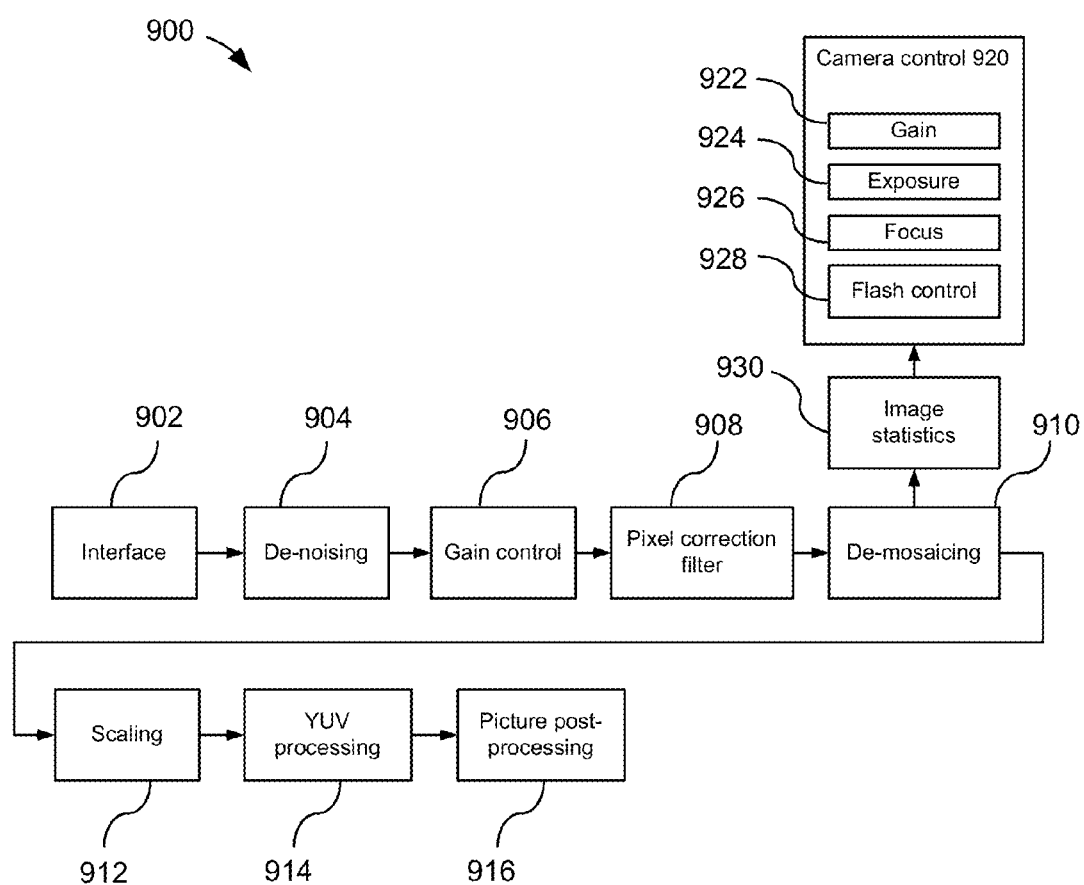
FIG. 9 is a block diagram illustrating an image processing pipeline that is used with embodiments of the disclosed automatic image capture methods.

An exemplary image processing pipeline that can be implemented by the image signal processor component 612 is illustrated in FIG. 9. In particular, the example image processing pipeline 900 shown in FIG. 9 receives raw image data from the image sensor via an interface 902 (e.g., an interface implemented by the OS 650), performs image processing, and composes a final color image (e.g., by applying color correction and colorimetric adjustments). In the illustrated embodiment, prior to capturing an image, raw image data is processed, for example, by one or more of a de-noising component 904, a gain control component 906, a pixel correction filter 908, and a de-mosaicing and white balancing component 910. The de-noising component filters out noise from the raw image data. A noise value can be measured in decibels (dB) and can be represented by a signal-to-noise (S/N) ratio. The gain control component 906 controls light intensity by modulating the electrical response of the image sensors. The pixel correction filter 908 can be used to correct for bad pixels in the image sensor and can use a low-pass filter for smoothing one or more portions of the image. The de-mosaicing component 910 processes the individual color channel signals that are output from the image sensor to create a full color image. More specifically, because the individual color channel signals are typically undersampled, de-mosaicing interpolates between them to reconstruct pixel colors based on neighboring pixel information. For example, a color filter array (such as Bayer filter) can be used to selectively filter, and thereby correct, the color for each pixel. Automatic white balancing (AWB) can also be performed. White balancing is typically performed after de-mosaicing. White balancing adjusts the color intensity of the individual color channels to compensate for the effect of the illuminant of the image. The resulting white balanced image will show colors more closely to their true hues.

In the illustrated embodiment, after de-mosaicing, data describing the image (sometimes referred to as "image metadata") can be assembled into a set of image statistics (or other image data 930). The image statistics can include, for example, a noise value (e.g., a signal-to-noise ratio in dB), a gain value, an exposure value, a focus value (e.g., a value based on relative contrast measurements between neighboring pixel intensity values, a value indicating the difference between light intensity patterns detected in a phase detection autofocus system, or another value indicating the level, or percentage, of focus in an image), a sharpness value (e.g., based on a combination of the focus value and other image values), and/or a flash value (e.g., a value indicating the percentage the flash is charged or another flash-readiness or flash-related value). The image statistics can be used to optimize camera settings 922-928. In the illustrated example, the camera settings include a gain setting 922, an exposure setting 924, a focus setting 926, and a flash control setting 928. The gain setting sets the electrical response of the image sensors for optimal intensity. The exposure setting 924 dictates how long the image sensor is set to actively detect light, or the amount of light that enters the lens according to the size or effective size of the lens aperture. The focus setting 926 can adjust the actual focal length of the digital optical system (by changing the physical distance between the lens and the image sensors), or it can adjust the image sensors electronically to change the effective focal length of the lens. The flash control setting 928 adjusts the duration and/or the intensity of light provided by the flash light source, which can depend on the duration of time that the flash unit charges in-between shots. Based on observations of the image statistics, a camera control component 920 can make suitable adjustments in these values.

In certain embodiments of the automatic image capture technique, image criteria can be set independently for each of the image statistics, (e.g., focus, exposure, gain, etc.), or a composite "sharpness" criterion can be set that takes into account the effect of multiple camera settings. Sharpness can be quantified, for example, as an evaluation of at least the degree of focus in an image (e.g., by performing a calculation based on relative contrast measurements between neighboring pixel intensity values in the image).

In certain embodiments, image statistics 930 are continuously generated for each new set of image data received by the image sensor (e.g., wherein each new set of image data is collected according to the current gain and exposure settings), and the camera settings 922-928 are continuously adjusted. In particular implementations, these sets of image data are not yet considered captured because they are not subject to certain post-demosaicing processes that can be computationally intensive and need not be performed unless the image is intended to be converted into a final image and stored. In some embodiments, one or more image criteria are set for auto-image capture. The image criteria can correspond to data available at various points along the image processing pipeline. In particular implementations, if any of the criteria are not met, then the image data is not further processed or stored, and the image is not considered to be "captured". When the image criteria (e.g., set by the user) are satisfied, however, image capture proceeds (e.g., by performing post-demosaicing processes, such as scaling, YUV processing, post-processing, and/or storage).

In the illustrated embodiments, processing components downstream of the de-mosaicing component 910 include a scaling component 912, a YUV processing component 914, and a picture post-processing component 916. In general, the scaling component 912 adjusts the image size for display or for a suitable image format. The YUV processing component converts the image (e.g., an RGB image) into an image comprising luminance (Y) and chrominance (U and V) components (where the UV color space encodes a color image using a bandwidth allocation scheme that takes into account the frequency dependence of human color perception). The picture post-processing component 916 performs further processing on an image that makes the image more suitable for display and/or storage. The post-processing can include, for example, red-eye removal, color enhancement, image stabilization, and/or blur reduction. Post-processing can also include object or facial recognition.

Using embodiments of the disclosed auto-capture application, processing along the image processing pipeline 900 can be discontinued at various points along the pipeline if the image does not satisfy certain criteria (e.g., user-established criteria). In certain embodiments, if any of the selected criteria are not satisfied, then the image data is discarded and the image is not used as one of the automatically captured images. In particular implementations, the auto-capture application can include a timer such that after a certain time elapses, image capture occurs regardless of whether the criteria are met so as not to omit image capture entirely. Further, in certain embodiments, the image is considered to be "captured" if processing of the image proceeds through to the later, post-demosaicing stages, of the image processing pipeline 900 (e.g., to the scaling component 912, YUV processing component 914, or picture processing component 916).

Criteria for triggering image capture can include, for example, a percentage or value of one or more of a noise value or an S/N ratio measured by the de-noising component 904, a gain value 922, an exposure value 924, one or more measurements detected by the de-mosaicing component 910, a focus value 926 (e.g., a value indicative of the precision or quality of the auto-focus, such as a value based on relative contrast measurements between neighboring pixel intensity values, a value indicating the difference between light intensity patterns detected in a phase detection autofocus system, or another value indicating the level (or percentage) of focus in an image), or a flash control value 928 (e.g., a value indicative of a flash-readiness level). In certain embodiments, if the one or more image quality criteria are satisfied, and if the mobile device is stable, then the image is captured and stored. In particular implementations, the final picture also includes the original raw image data (e.g., in the .RAW format), allowing a user to perform alternative processing or adjustment of the image.

Returning to FIG. 6, the device OS 650 is configured to manage user input functions, output functions, storage access functions, network communication functions, and other functions for the device. The device OS 650 provides access to such functions to the automatic image capture application 610. For example, in FIG. 6, the device OS 650 includes components for final image rendering (e.g., rendering visual output to a memory and/or a display), components for image or video recognition (e.g., components that interface with the image sensor hardware and prepare the received signals for use by the automatic image capture application), and components for motion recognition (e.g., components that interface with the accelerometer(s) and/or gyroscope(s) and prepare the received signals for use by the automatic image capture application). Final image rendering is typically done after picture processing is complete. Thus, final image rendering can be accomplished either by the OS 650 or as the last stage in the image processing pipeline 616.

As illustrated, a user can generate user input to the automatic image capture application 610 via a screen-based user interface (UI). The user actions detected by the UI can be in the form of finger motions, tactile input (such as touchscreen input), button presses or key presses, or audio (voice) input. The device OS 650 includes functionality for recognizing motions such as finger taps, finger swipes, and the like, for tactile input to a touchscreen, recognizing commands from voice input, button input or key press input, and creating messages that can be used by the automatic image capture application 610 or other software. UI event messages can indicate panning, flicking, dragging, tapping, or other finger motions on a touchscreen of the device, keystroke input, or another UI event (e.g., from voice input, directional buttons, trackball input, or the like).

Figure 7:
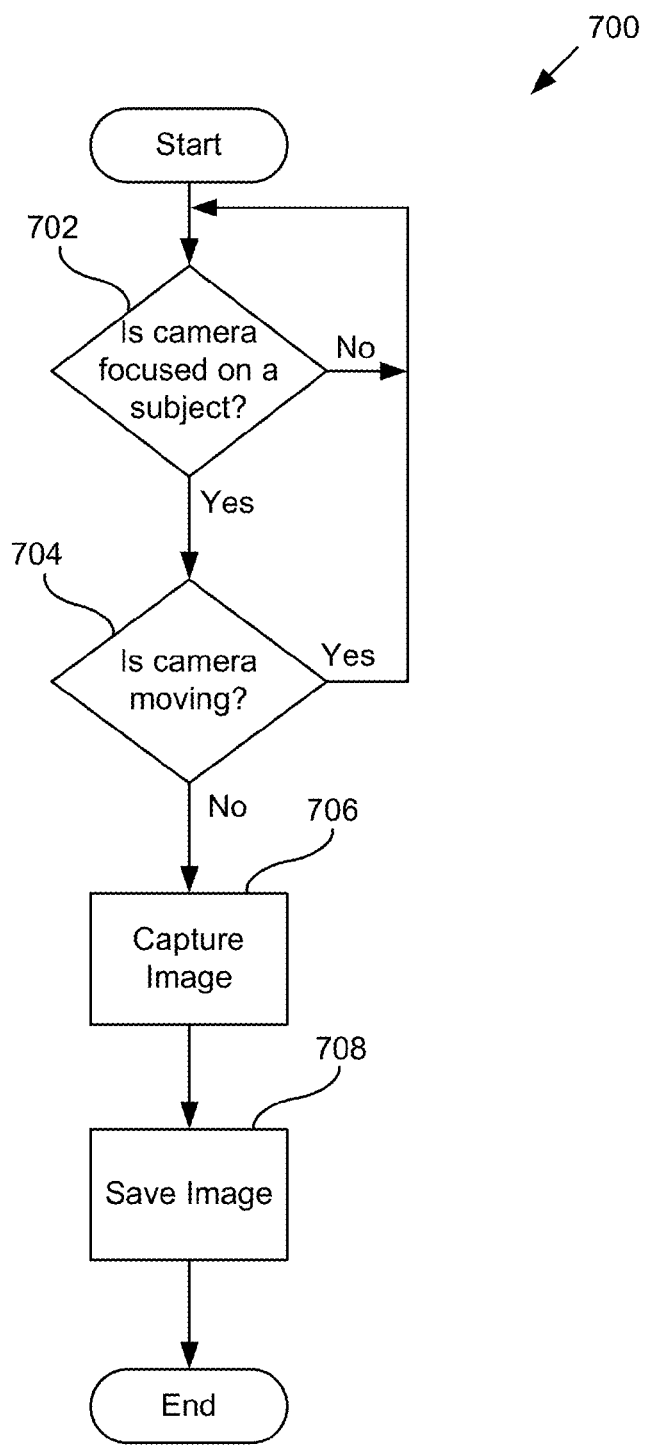
FIG. 7 is a flow chart of a first exemplary embodiment of an automatic image capture method.

FIG. 7 is a flow chart of an exemplary method 700 for performing automatic image capture. The exemplary method can be performed by a general processor performing an image processing procedure and/or a specialized processor (e.g., an image signal processor). The exemplary method 700 uses a series of trigger criteria to determine when an image is to be captured and stored. In the illustrated example, the trigger criteria include a focus condition and a motion condition to be met prior to executing an image capture event and an image storage event.

At 702, a determination is made as to whether the current image is in focus. For example, a measurement indicative of how focused the image produced by the image sensor is can be compared to a focus condition or threshold focus value (e.g., a value based on relative contrast measurements between neighboring pixel intensity values, a value indicating the difference between light intensity patterns detected in a phase detection autofocus system, or another value indicating the level (or percentage) of focus in an image). If the current image does not satisfy the focus condition, then the exemplary method waits until the focus condition is satisfied. Whether or not the camera satisfies the focus condition can be determined by comparing successive image frames to discern if the focus of the subject in the viewfinder is changing or not.

In particular embodiments, additional criteria are used. For example, one or more additional user-specified criteria can be set. For example, the criteria can include a subject recognition criterion, such as whether the subject is a human face. Image recognition software can be invoked to determine whether the subject recognition criterion is satisfied. The additional criteria can include any of the other criteria described herein, such as a focus value, a white balance value, an exposure value, a gain value, a noise value, a contrast value, a sharpness value, flash value, and/or other such image quality or processing parameter.

At 704, a determination is made as to whether the camera is moving. The determination at 704 can be based at least in part on data received from the device motion sensors (e.g., data from one or more accelerometers, one or more gyroscopes, and/or one or more other motion-sensing devices). Further, the data can be processed to determine a device stability value that is compared to a stored value (e.g., a user-selected device stability value) as explained above with respect to FIG. 5.

When data from the device motion sensors indicates that the device is stationary, image capture at 706 is triggered. For example, further image processing can be performed in the image processing pipeline, resulting in a final image. In particular implementations, one or more post-demosaicing processes (such as scaling, YUV conversion, post-processing, or other processing steps used to finalize an image for viewing and storage) are performed. At 708, the final image is stored. When data from the device motion sensors indicates that the device is not stationary, however, then the current image is discarded (e.g., the method does not perform further processing or storage of the image) and the method returns to 702.

Figure 8:
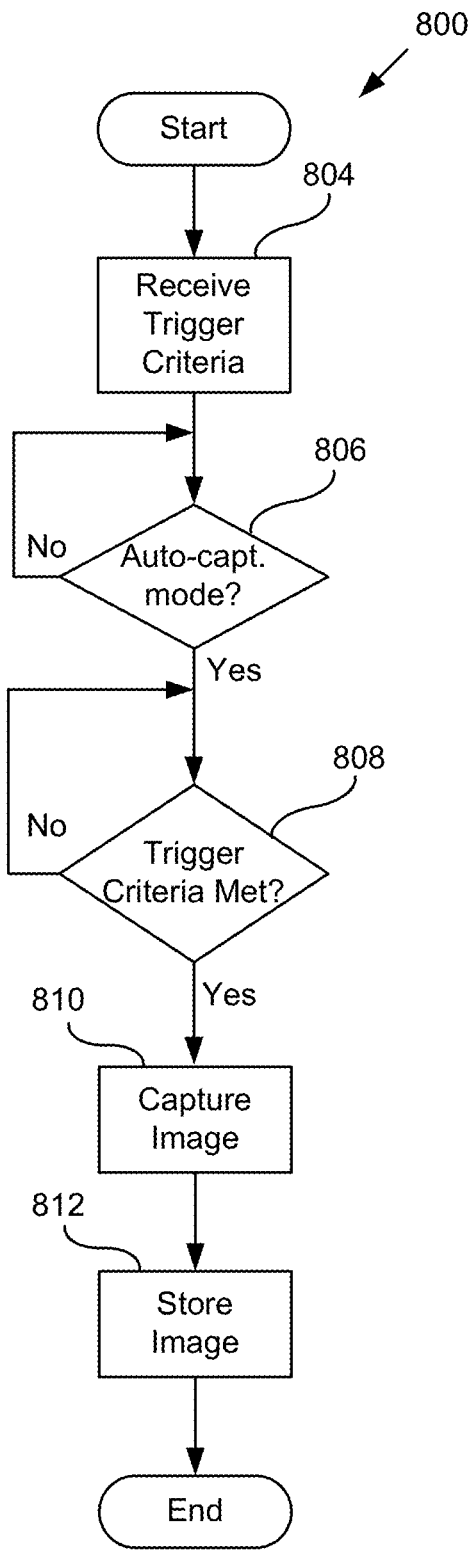
FIG. 8 is a flow chart of a second exemplary embodiment of an automatic image capture method.

FIG. 8 is a flow chart of another exemplary method 800 for performing automatic image capture. According to the method 800, image capture is performed when an image satisfies one or more image capture criteria.

At 804, one or more threshold values for triggering the automatic capture of images are recorded. For example, the one or more threshold values can be recorded after being input by a user using a suitable graphic user interface. In particular embodiments, for example, the one or more threshold values are set using a suitable auto-capture mode settings screen (e.g., such as auto-capture mode settings screen 540). The one or more threshold values can be, for example, a focus value, a white balance value, an exposure value, a device stability value, a gain value, a noise value, a contrast value, a sharpness value, a flash value, or other such image quality or processing parameters. In a particular embodiment, a subject recognition criterion is also input by the user. For example, the criterion can include that the image be of a human face (or of another recognizable subject).

At 806, a determination is made as to whether the mobile device is set into an auto-capture mode. The auto-capture mode can be set, for example, by a user selecting the auto-capture mode using a mode button (e.g., such as mode button 433 shown in FIG. 4).

At 808, a determination is made as to whether the image satisfies the one or more image trigger conditions (or criteria). As noted, the image trigger conditions can include one or more of a focus value, a white balance value, an exposure value, a device stability value, a value, a gain value, a noise value, a contrast value, a sharpness value, a flash value, or other such image capture and processing parameters. For example, if the focus value is used as a trigger criterion, a determination is made as to whether a current image is in focus. For example, a measurement indicative of how focused the image produced by the image sensor is can be compared to a focus condition or threshold focus value. If the current image does not satisfy the focus condition, then the exemplary method discards the current image (e.g., the method does not perform further processing or storage of the image), evaluates the next image in the image processing pipeline, and waits until the focus condition is satisfied. Further, when a subject recognition condition is set, the subject recognition condition is also tested at 808. For instance, if one of the conditions selected by the user is that the image be of a human face, then a facial recognition process can be performed to determine if the current image includes a face. If the current image does not satisfy the additional conditions, then the exemplary method discards the current image (e.g., the method does not perform further processing or storage of the image). Similarly, if one of the conditions is a device stability threshold, then a determination is made as to whether the camera is moving at 808. The device stability determination can be based at least in part on data received from the device motion sensors (e.g., data from one or more accelerometers, one or more gyroscopes, and/or one or more other motion-sensing devices). Further, the data can be processed to determine a device stability value that is compared to a stored value (e.g., a user-selected value) as explained above with respect to FIG. 5. If the current image satisfies the one or more image capture criteria, then the method continues at 810.

At 810, image capture is triggered. For example, further image processing can be performed in the image processing pipeline, resulting in a final image. In particular implementations, one or more post-demosaicing processes (such as scaling, YUV conversion, post-processing, or other processing steps used to finalize an image for viewing and storage) are performed. At 816, the final image is stored.

The particular order of operations illustrated in FIGS. 7 and 8 should not be construed as limiting as they can be performed in various other orders. For example, the determination of camera movement can be performed earlier than illustrated or at least partially simultaneously with any of the other operations. The evaluation of any of the other image quality criteria can similarly be performed in different orders or at least simultaneously with one another.

Although the technology has been described with reference to a mobile device, such as a smart phone, the technology can be implemented in diverse computing environments. For example, the disclosed technology may be implemented with other digital camera devices or computer system configurations, including handheld devices, multi-processor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules or instructions may be located in both local and remote memory storage devices.

Figure 10:
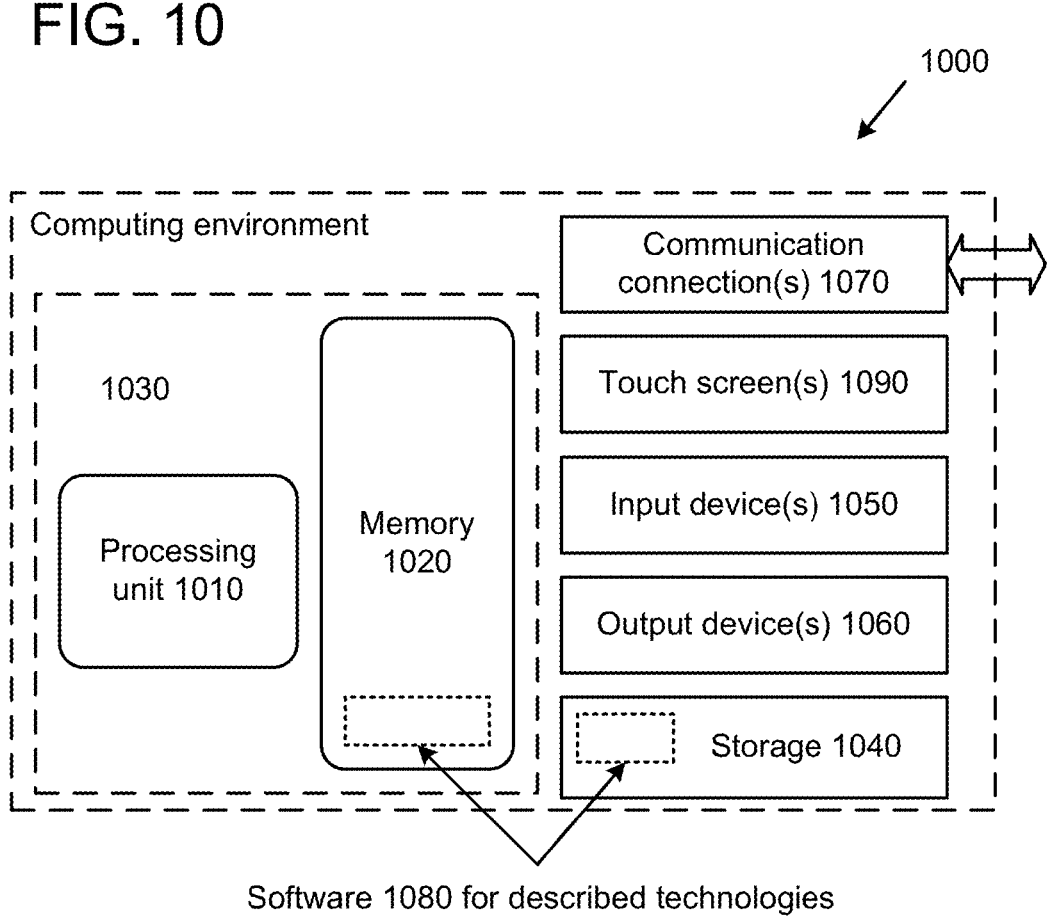
FIG. 10 illustrates a generalized example of a suitable computing environment in which described embodiments, techniques, and technologies can be implemented.

FIG. 10 illustrates a generalized example of a suitable computing environment 1000 in which embodiments of the disclosed technology can be implemented. With reference to FIG. 10, the computing environment 1000 includes at least one central processing unit 1010 and memory 1020. In FIG. 10, this most basic configuration 1030 is included within a dashed line. The central processing unit 1010 executes computer-executable instructions and may be a real or a virtual processor. In a multi-processing system, multiple processing units execute computer-executable instructions to increase processing power and as such, multiple processors can be running simultaneously. The memory 1020 may be volatile memory (e.g., registers, cache, RAM), non-volatile memory (e.g., ROM, EEPROM, flash memory, etc.), or some combination of the two. The memory 1020 stores software 1080 that can, for example, implement the technologies described herein. A computing environment may have additional features. For example, the computing environment 1000 includes storage 1040, one or more input devices 1050, one or more output devices 1060, one or more communication connections 1070, and one or more touchscreens 1090. An interconnection mechanism (not shown) such as a bus, a controller, or a network, interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other non-transitory storage medium which can be used to store information and that can be accessed within the computing environment 1000. The storage 1040 stores instructions for the software 1080, which can implement technologies described herein.

The input device(s) 1050 may be a touch input device, such as a touchscreen, keyboard, keypad, mouse, pen, or trackball, a voice input device, a scanning device, proximity sensor, image-capture device, or another device, that provides input to the computing environment 1000. For audio, the input device(s) 1050 may be a sound card or similar device that accepts audio input in analog or digital form. The output device(s) 1060 may be a display, touchscreen, printer, speaker, CD-writer, or another device that provides output from the computing environment 1000. The touchscreen 1090 can act as an input device (e.g., by receiving touchscreen input) and as an output device (e.g., by displaying an image capture application and authentication interfaces).

The communication connection(s) 1070 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1000. By way of example, and not limitation, with the computing environment 1000, computer-readable media include memory 1020 and/or storage 1040. As should be readily understood, the term computer-readable storage media includes non-transitory storage media for data storage such as memory 1020 and storage 1040, and not transmission media such as modulated data signals.

Having described and illustrated the principles of the disclosed technology in the detailed description and accompanying drawings, it will be recognized that the various embodiments can be modified in arrangement and detail without departing from such principles. For example, any technologies described herein for capturing still photos can also be adapted for capturing video. Elements of embodiments shown in software may be implemented in hardware and vice versa.

In view of the many possible embodiments to which the principles of the disclosed invention may be applied, it should be recognized that the illustrated embodiments are only preferred examples of the disclosed technology and should not be taken as limiting the scope of the disclosed technology. Rather, the scope of the disclosed technology is defined by the following claims and their equivalents. I therefore claim all that comes within the scope and spirit of these claims and their equivalents.

I claim:

1. A method of performing automatic image capture with a mobile device, the method comprising:
   receiving data indicative of trigger criteria selected by a user for image acceptance, the user-selected trigger criteria comprising user-selected image quality trigger criteria, the user-selected image quality trigger criteria comprising thresholds for one or more of a white balance process, an auto exposure process, a de-noising process, or a gain control process;
   entering an auto-capture camera mode;
   determining whether the trigger criteria are satisfied for an image sensed by an image sensor;
   based at least on determining that the trigger criteria are satisfied, and without further input from the user, triggering capture of the image; and
   storing the image in the memory,
   wherein the entering the auto-capture camera mode is based at least on the user selecting the auto-capture camera mode from a user interface displayed on the mobile device prior to each of the determining, triggering, and storing, and
   wherein the triggering the capture of the image comprises continuously processing sets of image data in an image processing pipeline as the sets of image data are received at the image sensor, the processing pipeline including demosaicing processing and post-demosaicing processing, the demosaicing processing being continuously performed as the sets of image data are received but the post-demosaicing processing being restricted from being performed until the capture of the image is triggered.

2. The method of claim 1, wherein the user-selected trigger criteria further comprise a criterion indicating whether the mobile device is stationary, and wherein the method further comprises determining whether the mobile device is stationary using data received from one or more of an accelerometer or gyroscope.

3. The method of claim 1, wherein the method comprises discontinuing image processing before performing one or more of image scaling, YUV processing, or image rendering for an image sensed by the image sensor if the one or more trigger criteria are not met.

4. The method of claim 1, wherein the image sensor is part of a camera that is incorporated into the mobile device.

5. The method of claim 1, wherein the capture of the image comprises performing one or more of image scaling, YUV processing, or image rendering.

6. The method of claim 1, wherein the method further comprises receiving data indicative of a user-selected length of time to pause automatic image capture after activation of the auto-capture camera mode, and wherein the determining, triggering, and storing are delayed upon the user selecting the auto-capture camera mode for the user-selected length of time.

7. The method of claim 1, wherein the method further comprises receiving data indicative of a user-selected number of images to capture while in the auto-capture camera mode, and wherein the determining, triggering, and storing are performed continuously until the user-selected number of images has been captured and stored.

8. One or more computer-readable memory or storage devices storing computer-executable instructions which when executed by a computing device cause the computing device to perform a method of performing automatic image capture with a mobile device, the method comprising:
receiving data indicative of trigger criteria selected by a user for image acceptance, the user-selected trigger criteria comprising user-selected image quality trigger criteria, the user-selected image quality trigger criteria comprising thresholds for one or more of a white balance process, an auto exposure process, a de-noising process, or a gain control process;
entering an auto-capture camera mode;
determining whether the trigger criteria are satisfied for an image sensed by an image sensor;
based at least on determining that the trigger criteria are satisfied, and without further input from the user, triggering capture of the image; and
storing the image in the memory,
wherein the entering the auto-capture camera mode is based at least on the user selecting the auto-capture camera mode from a user interface displayed on the mobile device prior to each of the determining, triggering, and storing, and
wherein the triggering the capture of the image comprises continuously processing sets of image data in an image processing pipeline as the sets of image data are received at the image sensor, the processing pipeline including demosaicing processing and post-demosaicing processing, the demosaicing processing being continuously performed as the sets of image data are received but the post-demosaicing processing being restricted from being performed until the capture of the image is triggered.

9. A mobile device comprising:
a lens;
an electronic image sensor;
a touchscreen display;
one or more motion detectors configured to sense motion of the mobile device;
a memory; and
a processor programmed to enter an auto-capture camera mode upon receiving an indication via the touchscreen display and, after entering the auto-capture camera mode, to make a determination from data provided by the one or more motion detectors of whether the mobile device is stationary, and, based at least in part on the determination, to trigger image capture and storage of the image in the memory,
wherein the determination of whether the mobile device is stationary comprises determining whether changes to motion measurements detected by the one or more motion detectors satisfy a threshold value during a period of time, and
wherein image data is processed in an image processing pipeline, the image processing pipeline including demosaicing processing and post-demosaicing processing, the demosaicing processing being continuously performed as sets of image data are received but the post-demosaicing processing being restricted from being performed until the mobile device is determined to be stationary and image capture is triggered.

10. The mobile device of claim 9, wherein the one or more motion detectors comprise one or more of an accelerometer or a gyroscope.

11. The mobile device of claim 9, wherein the processor is further programmed to make an image quality determination by evaluating whether one or more additional image quality criteria are satisfied, and to trigger or avoid the image capture and storage of the image based at least in part on the image quality determination.

12. The mobile device of claim 11, wherein the one or more additional image quality criteria comprise one or more of a white balance value, a focus value, a de-noising value, a gain value, a sharpness value, or a flash control value.

13. The mobile device of claim 11, wherein the one or more additional image quality criteria are user-selectable.

14. The mobile device of claim 9, wherein the mobile device further comprises a hardware button, and wherein the processor is further programmed to exit an automatic image capture mode when the hardware button is depressed.

15. The mobile device of claim 9, wherein the processor is further programmed to enter and exit an automatic image capture mode when a touchscreen button on the touchscreen display is selected.

16. The mobile device of claim 9, wherein both the threshold value and the period of time over which the determination is made are variable and based on a user-selected value.

17. A method for automatic image capture using a mobile electronic device camera, the method comprising:
determining whether the camera is focused on a subject;
sensing device motion;
continuously processing sets of image data in an image processing pipeline as the sets of image data are received at an image sensor, the processing pipeline including demosaicing processing and post-demosaicing processing, the demosaicing processing being continuously performed as the sets of image data are received but the post-demosaicing processing being restricted from being performed until the device is stationary and the camera is focused on the subject; and
saving an image generated by post-demosaicing processing in a memory.

18. The method of claim 17, wherein the determining comprises comparing data from successive image frames.

19. The method of claim 17, wherein the method further comprises performing image recognition to evaluate whether or not the subject meets a user-specified criterion, and wherein the post-demosaicing processing is performed when the device is stationary, when the camera is focused on the subject, and when the subject meets the user-specified criterion.

20. The method of claim 17, wherein the post-demosaicing processing that is restricted includes scaling and YUV processing.

21. One or more computer-readable memory or storage devices storing computer-executable instructions which when executed by a computing device cause the computing device to perform a method for automatic image capture using a mobile electronic device camera, the method comprising:
determining whether the camera is focused on a subject;
sensing device motion;
continuously processing sets of image data in an image processing pipeline as the sets of image data are received at an image sensor, the processing pipeline including demosaicing processing and post-demosaicing processing, the demosaicing processing being continuously performed as the sets of image data are received but the post-demosaicing processing being restricted from being performed until the device is stationary and the camera is focused on the subject; and
saving an image generated by post-demosaicing processing in a memory.

* * * * *